US009457528B2

(12) United States Patent
Park et al.

(10) Patent No.: US 9,457,528 B2
(45) Date of Patent: *Oct. 4, 2016

(54) PREPARATION METHOD FOR DRAWN POLY (ETHYLENETEREPHTHALATE) FIBER, DRAWN POLY (ETHYLENETEREPHTHALATE) FIBER, AND TIRE CORD

(75) Inventors: Sung-Ho Park, Daejeon (KR); Il Chung, Daegu (KR); Gi-Woong Kim, Daegu (KR)

(73) Assignee: KOLON INDUSTRIES, INC., Kwacheon (KR)

( * ) Notice: Subject to any disclaimer, the term of this patent is extended or adjusted under 35 U.S.C. 154(b) by 278 days.

This patent is subject to a terminal disclaimer.

(21) Appl. No.: 14/007,900

(22) PCT Filed: Mar. 30, 2012

(86) PCT No.: PCT/KR2012/002402
§ 371 (c)(1),
(2), (4) Date: Sep. 26, 2013

(87) PCT Pub. No.: WO2012/134229
PCT Pub. Date: Oct. 4, 2012

(65) Prior Publication Data
US 2014/0018513 A1 Jan. 16, 2014

(30) Foreign Application Priority Data

Mar. 31, 2011 (KR) .................. 10-2011-0029871
Mar. 30, 2012 (KR) .................. 10-2012-0032904

(51) Int. Cl.
| | | |
|---|---|---|
| D01D 5/16 | (2006.01) |
| B29D 30/06 | (2006.01) |
| D02G 3/48 | (2006.01) |
| D02J 1/22 | (2006.01) |
| D01D 5/08 | (2006.01) |
| D01F 6/62 | (2006.01) |
| C08G 63/183 | (2006.01) |
| D01D 5/12 | (2006.01) |
| D01F 1/10 | (2006.01) |
| B60C 9/00 | (2006.01) |

(52) U.S. Cl.
CPC ......... B29D 30/0681 (2013.01); B60C 9/0042 (2013.04); C08G 63/183 (2013.01); D01D 5/08 (2013.01); D01D 5/12 (2013.01); D01F 1/10 (2013.01); D01F 6/62 (2013.01); D02G 3/48 (2013.01); D02J 1/22 (2013.01); B60C 2009/0416 (2013.04); B60C 2009/2252 (2013.04); D10B 2331/04 (2013.01)

(58) Field of Classification Search
CPC ........... B29D 30/0681; B60C 9/0042; C08G 63/183; D01D 5/08; D01D 5/12; D01D 5/16; D01F 1/10; D01F 6/62; D02J 1/22; D10B 2331/04

USPC ............... 264/103, 129, 210.2, 210.3, 210.4, 264/210.5, 210.6, 210.8, 211, 211.14, 264/211.17; 528/308.1, 308.3, 308.6, 308.8
See application file for complete search history.

(56) References Cited

U.S. PATENT DOCUMENTS

| | | | | |
|---|---|---|---|---|
| 3,770,866 A | * | 11/1973 | Sakata et al. ............. | D01F 6/62 264/289.3 |
| 4,420,534 A | * | 12/1983 | Matsui ..................... | A46D 1/00 428/372 |
| 4,491,657 A | | 1/1985 | Saito et al. | |
| 4,827,999 A | | 5/1989 | Yabuki et al. | |
| 4,869,958 A | * | 9/1989 | Murase ..................... | D01F 6/62 428/364 |
| 5,942,176 A | * | 8/1999 | Fujii ....................... | D06M 7/00 252/8.84 |
| 6,680,353 B1 | | 1/2004 | Kato et al. | |
| 2003/0059612 A1 | | 3/2003 | Cho et al. | |
| 2004/0058805 A1 | * | 3/2004 | Nakajima ................. | D01F 6/62 502/152 |
| 2004/0176564 A1 | | 9/2004 | Yamamoto et al. | |
| 2004/0214984 A1 | | 10/2004 | Keep et al. | |
| 2007/0238816 A1 | * | 10/2007 | Kliesch ..................... | C08J 5/18 524/114 |

(Continued)

FOREIGN PATENT DOCUMENTS

| | | |
|---|---|---|
| CN | 1325426 A | 12/2001 |
| CN | 1527856 A | 9/2004 |
| CN | 101748507 A | 6/2010 |

(Continued)

OTHER PUBLICATIONS

European Patent Office, Communication issued Sep. 15, 2014 in the counterpart European Patent Application No. 12762788.3.

(Continued)

*Primary Examiner* — Leo B Tentoni
(74) *Attorney, Agent, or Firm* — Sughrue Mion, PLLC

(57) ABSTRACT

Disclosed are a preparation method for drawn fibers that enables the preparation of drawn poly(ethyleneterephthalate) fibers exhibiting with high fineness of at least 2,000 denier while having high tenacity and excellent dimensional stability and causes almost no deterioration of tenacity during the manufacturing process of tires such as vulcanization, and a drawn poly(ethyleneterephthalate) fiber and a tire cord that are obtained by the preparation method. The preparation method for drawn poly(ethyleneterephthalate) fiber includes: melt-spinning a polymer comprising at least 90 mol % of poly(ethyleneterephthalate) having a content of terminal carboxyl group (—COOH) in the range of 20 to 30 eq/$10^6$g at a spinning speed of 2,500 to 4,000 m/min to form a undrawn fiber having a fineness of at least 2,000 denier; and drawing the undrawn fiber at a draw ratio of 1.4 to 2.4.

4 Claims, 1 Drawing Sheet

(56) References Cited

U.S. PATENT DOCUMENTS

| | | |
|---|---|---|
| 2011/0024013 A1 | 2/2011 | Chung et al. |
| 2011/0024016 A1 | 2/2011 | Chung et al. |

FOREIGN PATENT DOCUMENTS

| | | |
|---|---|---|
| KR | 10-2009-0104746 A | 10/2009 |
| KR | 10-2010-0010467 A | 2/2010 |
| KR | 10-2011-0001500 A | 1/2011 |
| WO | 2009/123413 A2 | 10/2009 |
| WO | 2009123414 A2 | 10/2009 |

OTHER PUBLICATIONS

"Plastic Additives Handbook," 6th edition of 2009, pp. 82-87.

* cited by examiner

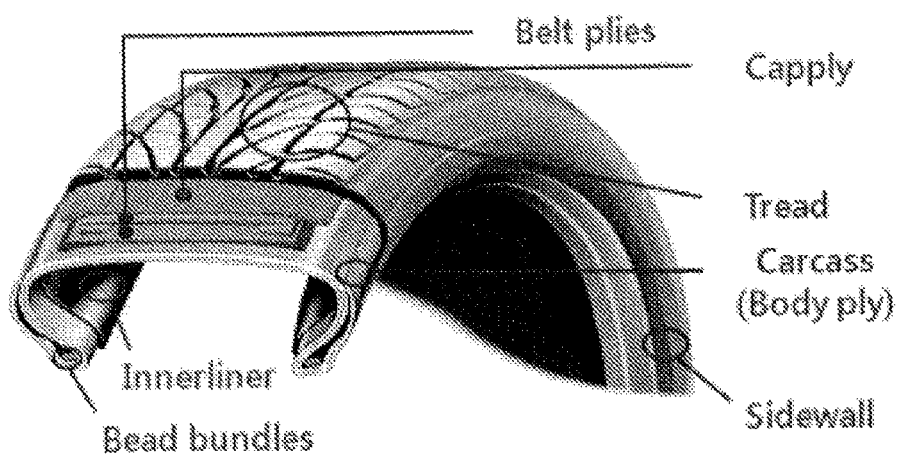

PREPARATION METHOD FOR DRAWN POLY (ETHYLENETEREPHTHALATE) FIBER, DRAWN POLY (ETHYLENETEREPHTHALATE) FIBER, AND TIRE CORD

CROSS REFERENCE TO RELATED APPLICATIONS

This is a National Stage of International Application No. PCT/KR2012/002402, filed Mar. 30, 2012, claiming priority from Korean Patent Application Nos. 10-2011-0029871, filed Mar. 31, 2011 and KR 10-2012-0032904 filed Mar. 30, 2012, the contents of all of which are incorporated herein by reference in their entirety.

TECHNICAL FIELD

The present invention relates to a preparation method for drawn fibers that enables the preparation of drawn poly (ethyleneterephthalate) fibers exhibiting with high fineness of at least 2,000 denier while having high tenacity and excellent dimensional stability and causes almost no deterioration of tenacity during the manufacturing process of tires such as vulcanization, and a drawn poly(ethyleneterephthalate) fiber and a tire cord that are obtained by the preparation method.

BACKGROUND OF THE ART

Tire is a complex body of fiber/steel/rubber and generally has a structure as illustrated in FIG. 1. The body ply, which is denoted by the numeral 6 of FIG. 1 and also called as "carcass", is a cord layer included in a tire as a core reinforcement material that supports the load of a whole vehicle, maintain the shape of the tire, stands against the shock, and needs to have excellent fatigue resistance against bending and stretching movements during the drive. The tire cord for such a body ply is usually made of a synthetic fiber material, including polyester such as poly(ethyleneterephthalate).

The cords made of synthetic fibers, thanks to their high tenacity, greatly contribute to the enhanced durability of tires, yet with a problem that they may have deterioration in elasticity and dimensional stability after vulcanization of tires because of their high shrinkage rate under heat. To offset this, there have been made many studies to improve the dimensional stability of cords by adopting an additional process such as post cure inflatation (PCI). Particularly, high tenacity fibers for industrial use exhibit high tenacity as achieved by increasing the draw ratio at low speed but still remain requisitely in need of the PCI process due to their high heat shrinkage rate and low elasticity.

As the ultrahigh speed spinning technology has recently been grafted onto the preparation method of tire cords, it is now possible to prepare polyester tire cords having high-modulus low-shrinkage (HMLS) properties without a need for the PCI process.

In this regard, undrawn fibers with high crystallinity are necessarily used in order to prepare HMLS tire cords. However, the undrawn fibers with high crystallinity have a relatively narrow drawing range and thus tend to break by uneven drawing or friction when they are drawn under conditions of high speed and high draw ratio in an ultrahigh speed spinning system. On this account, applying the undrawn fibers with high crystallinity to the ultrahigh speed spinning system is bound to limitations in the draw ratio and ends up with insufficient drawing, causing great deterioration in the tenacity of the drawn fibers. Particularly, the preparation of drawn fibers with high fineness of 2,000 denier or greater and tire cords entails greater deterioration of properties due to its limitations in the spinning process and the cooling process and thus results in a failure to produce tire cords with uniform properties.

This problem makes difficult to meet the demand for providing tire cords with high fineness and uniform, excellent properties that is attendant to the recent increase in the use of radial tires. Furthermore, the tire cords with high fineness are usually applied to large-sized tires and thus susceptible to deterioration of tenacity under a long-term vulcanization process as a result of using an excess of rubber per vulcanization time. This further leads to a great deterioration in the properties such as tenacity, still there is no suggestion to improve the problem.

SUMMARY OF THE INVENTION

Accordingly, the present invention provides a preparation method for drawn poly(ethyleneterephthalate) fibers that enables an efficient production of drawn poly(ethyleneterephthalate) fibers exhibiting high tenacity and excellent dimensional stability while having high fineness of at least 2,000 denier and causes almost no deterioration of tenacity during the preparation process of tires such as vulcanization.

The present invention also provides a drawn poly(ethyleneterephthalate) fiber obtained by the preparation method.

Further, the present invention provides a poly(ethyleneterephthalate) tire cord having high fineness while exhibiting high tenacity and excellent dimensional stability almost without causing a deterioration of tenacity, and its preparation method.

The present invention provides a preparation method for drawn poly(ethyleneterephthalate) fiber that comprises: melt-spinning a polymer comprising at least 90 mol % of poly(ethyleneterephthalate) having a content of terminal carboxyl group (—COOH) in the range of 20 to 30 eq/ $10^6$ g at a spinning speed of 2,500 to 4,000 m/min to form a undrawn fiber having a fineness of at least 2,000 denier; and drawing the undrawn fiber at a draw ratio of 1.4 to 2.4.

The present invention also provides a drawn poly(ethyleneterephthalate) fiber comprising a polymer containing at least 90 mol % of poly(ethyleneterephthalate) and having a tenacity of 7.3 to 8.5 g/d after 6-hour heat treatment at 160° C. under a load of 0.01 g/d.

The present invention also provides a method for preparing a poly(ethyleneterephthalate) tire cord that comprises: forming drawn poly(ethyleneterephthalate) fibers using the above-specified preparation method; co-twisting the drawn fibers to form a twisted yarn; and dipping the twisted yarn in an adhesive solution and then performing a heat treatment.

The present invention also provides a poly(ethyleneterephthalate) tire cord comprising a polymer containing at least 90 mol % of poly(ethyleneterephthalate) and having a tenacity of 6.5 to 8.5 g/d after 6-hour heat treatment at 160° C. under a load of 0.01 g/d.

DETAILED DESCRIPTION OF THE EMBODIMENTS

Hereinafter, a description will be given as to a preparation method for drawn poly(ethyleneterephthalate) fiber, a method for preparing a tire cord, and a drawn fiber and a tire cord obtained from the methods according to the specified embodiments of the present invention. However, since the embodiments are provided as examples of the present invention, the scope of the present invention is not limited to or by them. It is obvious to those skilled in the related art that various modifications of the embodiments are possible within the scope of the present invention.

In addition, the term 'include' or 'comprise' means that include any component (or any element) without particular limitations unless otherwise mentioned in the present entire disclosure, and it cannot be interpreted as it excludes the addition of the other components (or elements).

A poly(ethyleneterephthalate) (hereinafter, referred to as "PET") tire cord may be prepared as a dip cord type by melt-spinning a PET polymer to prepare an undrawn fiber, drawing the undrawn fiber to form a drawn fiber, co-twisting the PET drawn fibers and dipping the twisted yarn into an adhesive. Therefore, the characteristics of the undrawn fiber prepared by melt-spinning the PET polymer and the drawn fiber prepared by drawing the undrawn fiber feed into the properties of the PET tire cord directly or indirectly.

The inventors of the present invention have studied repeatedly on the drawn PET fibers for tire cord and found it out that applying the ultrahigh speed spinning technology to a PET polymer having a controlled content of terminal carboxyl group (—COOH) in the range of 20 to 30 eq/$10^6$ g in the polymerization process leads to efficient production of a drawn PET fiber and a tire cord with high fineness while having high tenacity and excellent dimensional stability almost without a deterioration of properties such as tenacity even after the manufacturing process of large-sized tires, such as long-term vulcanization, thereby completing the present invention. In other words, using a polymer having a relatively low content of terminal carboxyl group controlled in the range of 20 to 30 eq/$10^6$ g can suppress the hydrolysis or aminolysis reaction of the polymer under heat, making it possible to produce a drawn PET fiber and a tire cord that have more excellent heat resistance almost without a deterioration of tenacity even after long-term heat treatment such as vulcanization. Further, the present invention appropriately applies the ultrahigh speed spinning technology using a PET polymer to efficiently produce a drawn PET fiber and a tire cord with high tenacity and excellent dimensional stability.

For this reason, the after-mentioned preparation method may produce a drawn PET fiber and a tire cord that have high fineness and exhibit high tenacity and excellent dimensional stability almost without a deterioration in properties such as tenacity even after the tire manufacturing process such as long-term vulcanization. Such a PET tire cord can be very desirably used as a body ply cord or a cap ply cord for pneumatic tires and particularly meet the demands in the related art for obtaining a tire cord with excellent properties and high fineness preferably applicable to large-sized tires.

In accordance with one embodiment of the present invention, there is provided a method for preparing a drawn PET fiber. The preparation method for a drawn PET fiber comprises: melt-spinning a polymer comprising at least 90 mol % of poly(ethyleneterephthalate) having a content of terminal carboxyl group (—COOH) in the range of 20 to 30 eq/$10^6$ g at a spinning speed of 2,500 to 4,000 m/min to form a undrawn fiber having a fineness of at least 2,000 denier; and drawing the undrawn fiber at a draw ratio of 1.4 to 2.4.

Hereinafter, a detailed description will be given as to the preparation method for drawn PET fiber.

In the preparation method, there is provided a polymer (hereinafter, referred to as "PET polymer") comprising at least 90 mol % of poly(ethyleneterephthalate) having a content of terminal carboxyl group (—COOH) in the range of 20 to 30 eq/$10^6$ g. As described above, using a polymer having a relatively low content of terminal carboxyl group (—COOH) controlled in the range of 20 to 30 eq/$10^6$ g makes it possible to prepare a drawn PET fiber and a tire cord that exhibit excellent heat resistance almost without a deterioration in properties such as tenacity even after long-term heat treatment such as vulcanization. But, an extremely low content of terminal carboxyl group undesirably leads to deterioration in the basic adhesiveness of the tire cord.

In order to control the content of terminal carboxyl group of the PET polymer within the defined range, a hindered phenol- or phenolic amine-based heat-resisting agent may be used in the polymerization process for forming a PET polymer. More specifically, such a hindered phenol- or phenolic amine-based heat-resisting agent is used in an amount of 3,000 to 5,000 ppm or about 4,000 to 5,000 ppm with respect to the total weight of the PET polymer in the polymerization reaction to form a PET polymer, which has the above-defined content of terminal carboxyl group. In this regard, the hindered phenol- or phenolic amine-based heat-resisting agent as used herein may be any substance typically known to those skilled in the art without specific limitations, specific examples of which may include hindered phenol- or phenolic amine-based heat-resisting agents known as TS-1™, Irganox 295™, Irganox 1019™, or Songnox 1098™.

Further, the polymer comprising PET used as a material for preparation of the undrawn fiber may include different additives in addition to PET but appropriately contains at least 90 mol % of PET. Using such a polymer ends up with preparation of a drawn fiber or a tire cord that exhibits good properties as will be described below. Hereinafter, the term "PET polymer" refers to a polymer having a PET content of at least 90 mol % without specific explanation.

In order to prepare the after-mentioned undrawn fiber at high spinning speed and high spinning tension, the PET polymer may have an intrinsic viscosity of 0.8 to 1.5 dl/g, preferably 1.2 to 1.5 dl/g. The drawn fiber and the tire cord may be enhanced in tenacity by using a polymer with relatively high intrinsic viscosity and adopting the ultrahigh speed spinning technology. It is, however, preferable to melt-spin a polymer having an intrinsic viscosity of 1.5 dl/g or less in order to suppress a break of the fiber caused by an excessive increase of the pressure in the pack during the spinning process.

The PET polymer having a content of terminal carboxyl group in the defined range is subjected to melt spinning at a spinning speed of 2,500 to 4,000 m/min to form an undrawn fiber with a fineness of at least 2,000 denier.

In this step of preparing an undrawn fiber, using the ultrahigh speed spinning technology leads to production of an undrawn fiber with high crystallinity, and the undrawn fiber is used in the subsequent process to prepare a tire cord with high tenacity and excellent dimensional stability. To acquire such a high crystallinity of the undrawn fiber, the polymer is subjected to melt spinning at a spinning speed of 2,500 to 4,000 m/min, preferably 3,000 to 4,000 m/min. In other words, the spinning speed is preferably 2,500 m/min or greater with a view to acquiring the desired properties of the undrawn fiber such as high crystallinity or productivity; and appropriately 4,000 m/min or less in consideration of the minimum cooling time as required in the preparation of a undrawn fiber and the mechanical vibration and friction occurring during the high-speed spinning process.

In addition, the melt spinning of the polymer is preferably performed under a spinning tension of 0.8 to 1.2 g/d. In other words, the spinning tension is preferably 0.8 g/d or greater with a view to acquiring the desired properties of the undrawn fiber as required in the present invention, such as high crystallinity; and 1.2 g/d or less in order to prevent a break of the filament caused by unnecessarily high tension or a deterioration in the properties.

The melt spinning process may be carried through a spinning spinneret with 400 to 700, or 450 to 650, or 500 to 600 spinning holes. Typically, in the case that a drawn fiber with a high fineness of at least 2,000 denier and a tire core are manufactured using general spinning equipment, the amount of the polymer discharge staying in the spinning chimney is greatly increased to cause non-uniform cooling between inner and outer layers, making it difficult to produce a drawn fiber and a tire cord with uniform properties and high yarn quality. Further, the discharge rate of the melt portion in the spinneret increases with an increase in the fineness of monofilaments, making it difficult to impose a sufficient spinning tension. As a consequence, the increased cooling difference between the inner and outer layers of the monofilaments leads to occurrence of the difference in the degree of orientation to deteriorate tenacity, and the lower spinning tension also deteriorates the dimensional stability, ending up with not satisfying the requirements of a tire cord in regards to the characteristics. However, melt-spinning a polymer through a spinning spinneret with a relatively large number of spinning holes in the range of 400 to 700 enables uniform cooling and optimizes the fineness of the monofilaments, making it relatively easier to impose the spinning tension. Further, the number of spinning holes optimized to 700 or less may reduce the fiber-to-fiber interference and thereby lead to production of a drawn fiber and a tire cord with uniform, good properties and high yarn quality.

After the step of melt-spinning the PET polymer under the above-defined conditions, a cooling process is performed to prepare an undrawn fiber, which cooling process preferably includes blowing a cooling air at 15 to 60° C. Under the respective temperature conditions of the cooling air, the cooling air flow is preferably controlled in the range of 0.7 to 1.5 m/s. In the case of preparing a drawn fiber with a high fineness of at least 2,000 denier and a tire cord, there is a high possibility that the amount of the polymer discharge staying in the spinning chimney is greatly increased to cause non-uniform cooling or poor cooling, and the cooling air control is of a great importance. An extremely low cooling air flow entails the high possibility of non-uniform cooling or poor cooling due to deficiency of the cooling air capacity, increases broken filaments and causes deterioration in yarn quality and tenacity. Contrarily, an extremely high cooling air flow possibly leads to fiber-to-fiber impingement or fiber scattering due to the excessively high cooling air speed.

The undrawn fiber obtained by the above process may have a crystallinity of 10 to 30% and a low amorphous orientation factor of 0.08 to 0.2. By adopting the ultrahigh speed spinning technology, the undrawn fiber with such crystalline characteristics is obtained and then used to prepare a drawn fiber and a tire cord, making it possible to manufacture a tire cord with high tenacity and excellent dimensional stability. The related technical mechanism may be predicted as follows.

The PET polymer constituting the undrawn fiber is basically partly crystalline and hence divided into a crystalline region and an amorphous region. By the way, the undrawn fiber obtained under the controlled conditions of melt spinning has a crystallinity of at least 10%, preferably 10 to 30%, which is higher than that of the existing undrawn fibers (typically, 7% or less) due to the orientation-induced crystallization. With such a high crystallinity of the undrawn fiber, the drawn fiber and the tire cord as prepared by using the undrawn fiber may exhibit high contraction stress and high modulus.

Also, the undrawn fiber has an amorphous orientation factor of 0.2 or less, preferably 0.08 to 0.2, which is far lower than that of the existing undrawn fibers. In this regard, the term "amorphous orientation index" indicates the degree of orientation of chains included in the amorphous region of the undrawn fiber. The amorphous orientation index decreases as the chains in the amorphous region are getting more entangled. Generally, the lower amorphous orientation index results in the higher degree of randomness, making the chains of the amorphous region have a relaxed structure, so the drawn fiber and the tire cord prepared from the undrawn fiber may exhibit low shrinkage rate and low contraction stress. However, molecule chains constituting the undrawn fiber obtained under the above-defined conditions of melt spinning form a minute network structure due to sliding during the spinning process and thus provide more cross-linkages per unit volume. For this reason, the undrawn fiber may have a strained structure of the chains in the amorphous region even with a reduced amorphous orientation index, so it exhibits a developed crystalline structure and excellent orientation characteristics. Therefore, not only the undrawn fiber but also the drawn fiber and the tire cord obtained from the undrawn fiber may have high contraction stress and high modulus as well as low shrinkage rate, making it possible to provide a tire cord with excellent dimensional stability.

As already described above, the PET polymer is controlled in regards to the content of terminal carboxyl group as well as the above-defined conditions of melt spinning. This suppresses the hydrolysis of the polymer to enhance heat resistance and thus enables it to produce a drawn fiber and a tire cord with minimized deterioration of properties such as tenacity even after the manufacturing process for large-sized tires, such as long-term vulcanization.

After formation of the undrawn fiber, the undrawn fiber is drawn to produce a drawn PET fiber. The drawing step may be carried out by the direct spinning & drawing (hereinafter, referred to as "DSD") method, where spinning and drawing are continuously performed in a single process according to the general preparation for drawn fiber.

Preferably, the drawing step is performed at the draw ratio of 1.4 to 2.4, or 1.5 to 2.0, or 1.5 to 1.9. In other words, the draw ratio is preferably 1.4 or greater with the view to preparing a tire cord with high tenacity and excellent dimensional stability; and 2.4 or less in consideration of the limitation in controlling the draw ratio in the case of the ultrahigh speed spinning system in which the spinning speed is 2,500 to 4,000 m/min.

The drawn fiber thus obtained by the above-described method may have minimized deterioration in the properties such as tenacity even after a heat treatment corresponding to long-term vulcanization. For example, the tenacity of the drawn fiber after 6-hour heat treatment at 160° C. under a load of 0.01 g/d may be at least 7.3 g/d, more specifically, 7.3 to 8.5 g/d, or 7.5 to 8.0 g/d. Also, the drawn fiber may exhibit excellences in general properties, such as a tenacity of at least 8.0 g/d, appropriately 8.0 to 9.5 g/d; an intermediate elongation at a load of 4.5 g/d in the range of 4.0 to 7.0%; an elongation at break in the range of 10.0 to 15.0%; and an intrinsic viscosity of 0.9 to 1.2 dl/g. At the same time, the drawn fiber may have a high fineness of 2,000 to 6,000 denier, so it can satisfy the demands for acquiring a tire cord with excellent properties and high fineness for large-sized tires as required in the related art.

In accordance with another embodiment of the present invention, there is provided a method for preparing a PET tire cord using the above-specified preparation method for drawn PET fiber. The method of preparing a PET tire cord may comprise: forming a drawn PET fiber using the aforementioned preparation method; co-twisting the drawn fibers to form a twisted yarn; and dipping the twisted yarn in an adhesive solution and then performing a heat treatment.

In the preparation method of a tire cord, for example, the co-twisting step may be carried out by 'Z' twisting the drawn fiber having a total fineness of 2,000 to 4,000 denier with a twisting level of 100 to 400 TPM (twists per meter), and 'S' twisting 1 to 3 plies of the 'Z' twisted fibers with a twisting level of 100 to 400 TPM to prepare a twisted yarn having a total fineness of 4,000 to 12,000 denier.

Furthermore, the adhesive solution as used herein may be an adhesive solution which has been conventionally used for preparing a tire cord, such as, for example, resorcinol-formaldehyde-latex (RFL) adhesive solution. And the heat treatment process may be carried out at the temperature of 230 to 260° C. for 90 to 360 seconds, preferably at 240 to 250° C. for 90 to 240 seconds, more preferably at 245 to 250° C. for 90 to 120 seconds. The twisted yarn is dipped into the adhesive solution and then subjected to the heat treatment to enhance the stability of the tire cord and further reduce the change of properties during the vulcanization of the tire.

The drawn fiber and the tire cord may be prepared through the above-specified methods. However, each step is just an example of the preparation methods for a drawn fiber and a tire cord, so the preparation methods may further include, of course, any step typically carried out in the related art of the present invention prior to or after each of the steps.

The tire cord prepared by such a process may have minimized deterioration in the properties such as tenacity even after the heat treatment corresponding to long-term vulcanization. For example, the tenacity of the tire cord after 6-hour heat treatment at 160° C. under a load of 0.01 g/d may be at least 6.5 g/d, more specifically, 6.5 to 8.5 g/d, or 6.7 to 7.5 g/d, or 6.8 to 7.2 g/d. Also, the tire cord may have a high fineness, such as a total fineness of 4,000 to 12,000 denier; a tenacity of 7.0 to 9.0 g/d; and a dimensional stability index (E-S index) of 5.5 to 7.5%, where the E-S index is the sum of a dry heat shrinkage rate after 2-minute heat treatment in an oven at 177° C. under a load of 0.01 g/d and an intermediate elongation at a load of 2.25 g/d. In this regard, the 'dimensional stability index (E-S index)' is given by the sum of the 'dry heat shrinkage rate (after 2 minutes in an oven at 177° C. under a load of 0.01 g/d)' and the 'intermediate elongation (@ 2.25 g/d load)', where the lower E-S index indicates less dimensional deformation and higher tenacity of the tire cord. Also, the tire cord may exhibit such properties as an intermediate elongation (@ 2.25 g/d load) of 3.5 to 6.5% and an elongation at break of at least 10.0%, appropriately 10.0 to 18.0%.

As disclosed above, the tire cord according to the above-specified process is prepared by adopting the ultrahigh speed spinning technology using a PET polymer controlled to have a defined range of the content of terminal carboxyl group, so it may exhibit high tenacity and excellent dimensional stability while having high fineness almost without deterioration in the properties such as tenacity even after the manufacturing process of large-sized tires such as long-term vulcanization. Such a tire cord is very preferably applicable to the body ply cord for pneumatic tires, particularly large-sized tires, so as to very effectively support the whole load of a vehicle. However, the use of the tire cord is not specifically limited to that as mentioned above and may be, of course, applicable to other use purposes like cap plies and so forth.

ADVANTAGEOUS EFFECT OF THE INVENTION

According to the present invention, there can be provided a tire cord and its preparation method, where the tire cord exhibits excellent dimensional stability and high tenacity while having a high fineness almost without deterioration in the properties such as tenacity even after the manufacturing process of large-sized tires such as long-term vulcanization. Such a tire cord is preferably applied to the body ply cords or the like for pneumatic tires, particularly large-sized tires, to enhance controllability and ride quality of a vehicle.

BRIEF DESCRIPTION OF THE DRAWINGS

FIG. 1 is a partial cut-away perspective view illustrating the construction of a general tire.

EXAMPLES

Hereinafter, preferable examples are provided for the understanding of the present invention. The following examples are, however, only for exemplifying the present invention and not intended to limit the scope of the present invention.

[Preparation of Drawn Fiber]

Examples 1 to 6

Preparation of Drawn PET Fiber of at Least 2,000 Denier by Adopting Ultrahigh Speed Spinning Technology Using PET Polymer Controlled in Content of Terminal Carboxyl Group First of all, a hindered phenol-based heat-resisting agent, Irganox™ 295 was added in the polymerization reaction to form a PET polymer controlled in the content of terminal carboxyl group. The PET polymer is then subjected to the ultrahigh speed spinning technology to prepare undrawn PET fibers according to Examples 1 to 6 by melt-spinning and cooling the PET polymer chips. In this regard, the used amount of the heat-resisting agent, the content of terminal carboxyl group, and the spinning conditions were given as presented in Table 1, and the other conditions were given as provided in the general preparation methods for PET polymers and undrawn PET fibers. Further, the undrawn fibers were drawn at a defined draw ratio as given in Table 1, heat-treated, and wound to prepare drawn PET fibers.

Comparative Examples 1 and 2

By contrast to Examples 1 to 6, drawn PET fibers were prepared by using the PET polymer not controlled in the content of terminal carboxyl group to the level of the preferred examples (Comparative Example 2) or not adopting the ultrahigh speed spinning technology (Comparative Example 1). The conditions for melt spinning as used in the comparative examples were as given in Table 1.

TABLE 1

| | Example | | | | | | Comparative Example | |
|---|---|---|---|---|---|---|---|---|
| | 1 | 2 | 3 | 4 | 5 | 6 | 1 | 2 |
| Intrinsic viscosity (dl/g) of polymer | 1.40 | 1.40 | 1.40 | 1.20 | 1.50 | 1.40 | 1.05 | 1.40 |
| Content of heat-resisting agent (ppm) | 4,000 | 4,000 | 4,000 | 4,000 | 4,000 | 5,000 | 4,000 | 1,000 |
| —COOH content (eq/$10^6$g) | 25 | 26 | 26 | 25 | 25 | 22 | 25 | 39 |
| Number of spinning holes (ea) | 500 | 500 | 500 | 500 | 500 | 500 | 450 | 500 |
| Spinning tension (g/d) | 0.85 | 0.99 | 1.12 | 1.04 | 1.15 | 1.13 | 0.61 | 1.12 |
| Spinning speed (m/min) | 3,000 | 3,200 | 3,500 | 3,500 | 3,500 | 3,500 | 2,400 | 3,500 |
| Draw ratio | 1.8 | 1.7 | 1.5 | 1.5 | 1.5 | 1.5 | 2.2 | 1.5 |
| Fineness (denier) | 2,000 | 2,000 | 2,000 | 2,000 | 2,000 | 2,000 | 2,000 | 2,000 |

[Measurement of Properties of Drawn Fibers]

Each of the drawn fibers prepared in Examples 1 to 6 and Comparative Examples 1 and 2 was measured in regards to the properties according to the following methods. The measurement results are presented in Table 2.

1) Content of terminal carboxyl group in PET polymer (eq/$10^6$ g): The ground polymer sample was dissolved in benzyl alcohol at 230° C. A phenol red indicator was added to the polymer sample, and the terminal carboxyl groups in the polymer sample were then titrated with solution of Potassium hydroxide and benzyl alcohol. The content of terminal carboxyl group (eq/$10^6$ g) was calculated as given by the following equation:

$$C=[\{(A-B)\times F\}/W]/10$$

In the above equation, C is the content of terminal carboxyl group (eq/$10^6$ g); A is the volume (ml) of the 0.1N solution of Potassium hydroxide and benzyl alcohol required to neutralize the terminal carboxyl groups in the polymer sample; B is the volume (ml) of the 0.1N solution of Potassium hydroxide and benzyl alcohol consumed in the blank test; and W is the weight (g) of the polymer sample.

2) Intrinsic viscosity of drawn fibers: Removed of oil and fat and dried out, the drawn fiber sample was measured in regards to the intrinsic viscosity with an Oswald viscometer according to the OCP method.

3) Tenacity and tenacity (g/d) after heat treatment: The tenacity of the fiber was measured with a universal testing machine (UTM) according to the ASTM D885 standard method. Also, the fiber was kept in an oven at 160° C. for 6 hours under a load of 0.01 g/d and then measured in regards to the tenacity in the same manner as described above.

4) Intermediate elongation (%) and elongation (%) at break: The intermediate elongation (@ 4.5 g/d load) and the elongation at break were measured with a universal testing machine (UTM) according to the ASTM D885 standard method.

TABLE 2

| Properties of drawn fibers | Example | | | | | | Comparative Example | |
|---|---|---|---|---|---|---|---|---|
| | 1 | 2 | 3 | 4 | 5 | 6 | 1 | 2 |
| Intrinsic viscosity | 1.142 | 1.140 | 1.138 | 1.087 | 1.178 | 1.144 | 0.935 | 1.131 |
| Tenacity (g/d) | 8.9 | 8.6 | 8.4 | 8.1 | 8.2 | 8.2 | 8.3 | 8.3 |
| Tenacity (g/d) after heat treatment | 8.0 | 7.8 | 7.8 | 7.6 | 7.7 | 7.8 | 7.2 | 6.7 |
| Intermediate elongation (%) | 4.5 | 4.8 | 5.0 | 4.9 | 5.4 | 5.5 | 3.8 | 5.1 |
| Elongation (%) at break | 10.5 | 11.1 | 11.8 | 11.4 | 12.2 | 12.4 | 9.8 | 12.1 |

As can be seen from Tables 1 and 2, the drawn fiber of the Comparative Example 1, which was prepared under the conditions of low spinning tension and low spinning speed without using the ultrahigh speed spinning technology, exhibited low intermediate elongation and low elongation at break, demonstrating insufficient dimensional stability. The drawn fiber of the Comparative Example 2 had the content of terminal carboxyl group out of the defined range of the preferred examples and showed great deterioration in the tenacity after heat treatment.

Contrarily, the drawn fibers of the Examples 1 to 6 not only had good properties, including tenacity, intermediate elongation, and elongation at break, but also showed high tenacity even after heat treatment.

[Preparation of Tire Cord]

Examples 7 to 12

The PET tire cords were respectively prepared by 'Z' twisting the drawn fiber prepared according to any one of Examples 1 to 6 with a specific total fineness and a twisting level per unit length (TPM); 'S' twisting 2 plies of the Z twisted fibers together with the same twisting level; dipping the same in an RFL adhesive solution; and drying and heat-treating the same. In this regards, the drawn fibers used therein, the fineness of the drawn fibers, the number of twists per meter (TPM), and the cord heat treatment conditions were as given in Table 3, and the composition of RFL adhesive solution and the drying conditions were the same as the conditions for the conventional preparation methods of PET tire cords.

Comparative Examples 3 and 4

The PET tire cords were prepared by using the drawn fibers prepared according to the conditions of Comparative Examples 1 and 2. The drawn fibers used therein, the fineness of the drawn fibers, the number of twists per meter (TPM), and the cord heat treatment conditions were as given in Table 3.

TABLE 3

| Cords | Drawn Fiber | Fineness of drawn fiber (denier) | Twists per meter (TPM) | Ply | Cord heat treatment conditions |
|---|---|---|---|---|---|
| Example 7 | Example 1 | 2,000 | 330 | 2 | 245~260° C., 90 sec. or more |
| Example 8 | Example 2 | 2,000 | 330 | 2 | 245~260° C., 90 sec. or more |
| Example 9 | Example 3 | 2,000 | 330 | 2 | 245~260° C., 90 sec. or more |
| Example 10 | Example 4 | 2,000 | 330 | 2 | 245~260° C., 90 sec. or more |
| Example 11 | Example 5 | 2,000 | 330 | 2 | 245~260° C., 90 sec. or more |
| Example 12 | Example 6 | 2,000 | 330 | 2 | 245~260° C., 90 sec. or more |
| Comparative Example 3 | Comparative Example 1 | 2,000 | 330 | 2 | 245~260° C., 90 sec. or more |
| Comparative Example 4 | Comparative Example 2 | 2,000 | 330 | 2 | 245~260° C., 90 sec. or more |

[Measurement of the Properties of the Tire Cords]

Each of the tire cords prepared according to the Examples 7 to 12 and Comparative Examples 3 and 4 were measured in regards to the properties in the same manner as given by the following methods. The measurement results are presented in Table 4.

1) Tenacity (g/d): The tenacity of a cord was measured with a universal testing machine (UTM) according to the ASTM D885 standard method. Also, the yarn was kept in an oven at 160° C. for 6 hours under a load of 0.01 g/d and then measured in regards to the tenacity in the same manner as described above.

2) Intermediate elongation (%) and elongation (%) at break: The intermediate elongation (@ 4.5 g/d load) and the elongation at break were measured with a universal testing machine (UTM) according to the ASTM D885 standard method.

3) Dry heat shrinkage rate (%): The dry heat shrinkage rate was measured with a dry heat shrinkage rate measuring device (MK-V manufactured by TESTRITE Co.) after kept in an oven at 177° C. for 2 min under a load of 0.01 g/d.

4) Dimensional stability index (E-S index): The sum of the intermediate elongation and the dry heat shrinkage rate measured by above methods was calculated.

TABLE 4

| Properties of cords | Example | | | | | | Comparative Example | |
|---|---|---|---|---|---|---|---|---|
| | 7 | 8 | 9 | 10 | 11 | 12 | 3 | 4 |
| Tenacity (g/d) | 7.96 | 7.69 | 7.51 | 7.24 | 7.25 | 7.33 | 7.22 | 7.54 |
| Intermediate elongation (%) | 4.0 | 4.0 | 4.0 | 4.0 | 4.1 | 4.1 | 4.0 | 4.1 |
| Elongation (%) at break | 15.3 | 15.7 | 16.1 | 16.5 | 16.3 | 15.9 | 15.4 | 15.2 |
| Dry heat shrinkage rate (%) | 2.3 | 2.1 | 1.8 | 1.7 | 2.0 | 2.1 | 4.2 | 2.3 |
| E-S index (%) | 6.3 | 6.1 | 5.8 | 5.7 | 6.1 | 6.2 | 8.2 | 6.4 |
| Tenacity (g/d) after heat treatment | 7.04 | 6.95 | 6.91 | 6.82 | 6.82 | 6.95 | 6.42 | 6.02 |

As can be seen from Tables 3 and 4, the tire cord of the Comparative Example 3, which was prepared under the conditions of low spinning tension and low spinning speed without using the ultrahigh speed spinning technology, exhibited low dimensional stability index (E-S index), demonstrating poor dimensional stability. The tire cord of the Comparative Example 4 was prepared from the PET polymer having the content of terminal carboxyl group out of the defined range of the preferred examples and showed great deterioration in the tenacity after heat treatment.

Contrarily, the tire cords of the Examples 7 to 12 not only had good properties, including tenacity, intermediate elongation, elongation at break, and dimensional stability, but also showed high tenacity even after heat treatment.

What is claimed is:

1. A preparation method for drawn poly(ethyleneterephthalate) fiber, comprising:
    melt-spinning a polymer comprising at least 90 mol% of poly(ethyleneterephthalate) having a content of terminal carboxyl group (—COOH) in the range of 20 to 30 eq/$10^6$g at a spinning speed of 2,500 to 4,000 m/min and a spinning tension of 0,8 to 1.2g/d to form a undrawn fiber having a fineness of at least 2,000 denier; and
    drawing the undrawn fiber at a draw ratio of 1.4 to 2.4, wherein the polymer comprising poly(ethyleneterephthalate) has an intrinsic viscosity of 1.2 to 1.5 dl/g;
    wherein the polymer comprising poly(ethyleneterephthalate) is prepared by performing polymerization in the presence of a hindered phenol- or phenolic amine-based heat-resisting agent; and
    wherein the hindered phenol- or phenolic amine-based heat-resisting agent is used in an amount of 4,000 to 5,000 ppm with respect to the total weight of the polymer comprising poly(ethyleneterephthalate).

2. The preparation method as claimed in claim 1, wherein the melt spinning step is performed through a spinneret with 400 to 700 spinning holes.

3. A method for preparing a poly(ethyleneterephthalate) tire cord, comprising:
    forming drawn poly(ethyleneterephthalate) fibers using the preparation method as claimed in claim 1;
    co-twisting the drawn fibers to form a twisted yarn; and
    dipping the twisted yarn in an adhesive solution and then performing a heat treatment.

4. The method as claimed in claim 3, wherein the heat treatment is performed at a temperature of 240 to 260° C. for 90 to 360 seconds.

* * * * *